United States Patent

Shimizu

[15] 3,650,193
[45] Mar. 21, 1972

[54] BULB AND TIME EXPOSURE CONTROL DEVICE FOR PHOTOGRAPHIC CAMERA

[72] Inventor: Munetaka Shimizu, Tokyo-to, Japan

[73] Assignee: Kabushiki Kaisha Koparu

[22] Filed: Dec. 8, 1969

[21] Appl. No.: 882,936

[30] Foreign Application Priority Data

Dec. 23, 1968 Japan..................................43/94379

[52] U.S. Cl. .............................95/53 EB, 95/10 CT, 95/11.5
[51] Int. Cl. ..........................................................G03b 7/08
[58] Field of Search ...................95/10 C, 53 R, 53 E, 53 EA, 95/53 EB, 11.5 R, 11

[56] References Cited

UNITED STATES PATENTS

| | | | |
|---|---|---|---|
| 3,318,215 | 5/1967 | Schiks | 95/11.5 |
| 3,362,311 | 1/1968 | Singer | 95/53 EB |
| 3,386,363 | 6/1968 | Rentschler | 95/53 EB |
| 3,425,329 | 2/1969 | Starp | 95/53 EB |
| 3,437,026 | 4/1969 | Espig | 95/53 EB |

*Primary Examiner*—Joseph F. Peters, Jr.
*Attorney*—Otto John Munz

[57] ABSTRACT

An electronically controlled camera shutter of the type in which exposure time is automatically controlled by an electronic circuit, in which the power switch of said circuit is controlled so as not to close when the shutter is set to operate for either bulb exposure or time exposure, whereby bulb and time exposures are performed by only mechanical elements of the shutter, by passing the electronic circuit, whereby use of the power source battery can be minimized.

8 Claims, 4 Drawing Figures

INVENTOR
MUNETAKA SHIMIZU

INVENTOR
MUNETAKA SHIMIZU

BY
ATTORNEY

INVENTOR
MUNETAKA SHIMIZU

BY
ATTORNEY

BULB AND TIME EXPOSURE CONTROL DEVICE FOR PHOTOGRAPHIC CAMERA

BACKGROUND OF THE INVENTION

1. Field of the Invention

The present invention is concerned with a bulb exposure control device for use in photographic cameras, plastics, more particularly, it relates to a bulb exposure control device in a photographic camera equipped with an electronically controlled. The exposure time is automatically controlled by an electromagnet energized into action by an electronic circuit. The bulb exposure is performed only by a mechanical means and not by the action of the circuit.

2. Description of the Prior Art

In a camera, in general, which is equipped with an electronically controlled shutter which is operative to control automatically exposure time by means of an electromagnet energized into action by an electronic circuit, electric power is consumed continuously throughout the entire period from the time an exposure is started until the time the exposure is completed. Accordingly, the amount of power consumption is very small in ordinary photography in exposures which last for only a short length of time. However, in photography with bulb exposures which take a relatively prolonged time, the power source battery is rapidly consumed because the circuit is continuously actuated throughout the exposure. For this reason, a means is needed which does not require action of the electronic circuit in order to automatically control the exposure time for a prolonged time as for bulb exposure.

SUMMARY OF THE INVENTION

It is, therefore, an object of the present invention to provide a bulb exposure control device for use in a camera equipped with an electronically controlled shutter of the type in which exposure time is automatically controlled by an electromagnet energized into action by an electronic circuit wherein a bulb exposure which takes a relatively prolonged length of time is accomplished by only a mechanical means without requiring the actuation of the circuit.

Another object of the present invention is to provide a bulb exposure control device which is capable of accomplishing the bulb exposure by means of a control lever adapted to be spring-driven by the position in which a bulb cam is set, which stops the movement of a magnet lever into a locked state so that its movement is controlled by an electromagnet to thereby prevent the shutter from being closed, whereby the bulb exposure can be performed quite easily by a simple changeover manipulation.

Still another object of the present invention is to provide a bulb exposure control device having an arrangement wherein a control lever, adapted to be controlled in its action by the setting position of a bulb cam, can be operated by a release lever, wherein the control lever stops the movement into a locked state of a magnet lever which is adapted to be controlled in its movement by an electromagnet to thereby prevent the shutter from being closed, and wherein the exposure is adapted to be completed owing to the actuation of the magnet lever caused by the return to the initial position of the release lever and the control lever, which return results from the completion of each release operation effected by the photographer. During the release operation, the electronic circuit for automatically controlling the exposure time remains completely unactuated because of the open state of the power switch thereof, which is arranged to be engageable both to of a shutter release lever associated with said release lever and to the control lever, whereby the bulb exposure device is actuated only by the mechanical means so that the battery is not consumed at all, whereby the service life of the power source battery is very long.

Yet another object of the present invention is to provide a bulb exposure control device, which is also capable of performing a time exposure, by adding a small number of mechanical constituent elements to the bulb exposure control device.

The foregoing as well as other objects, features and attendant advantages of the present invention will become more apparent by reading the following description and the appended claims, when considered in conjunction with the accompanying drawings.

DESCRIPTION OF THE PREFERRED EMBODIMENT

Figure 1:
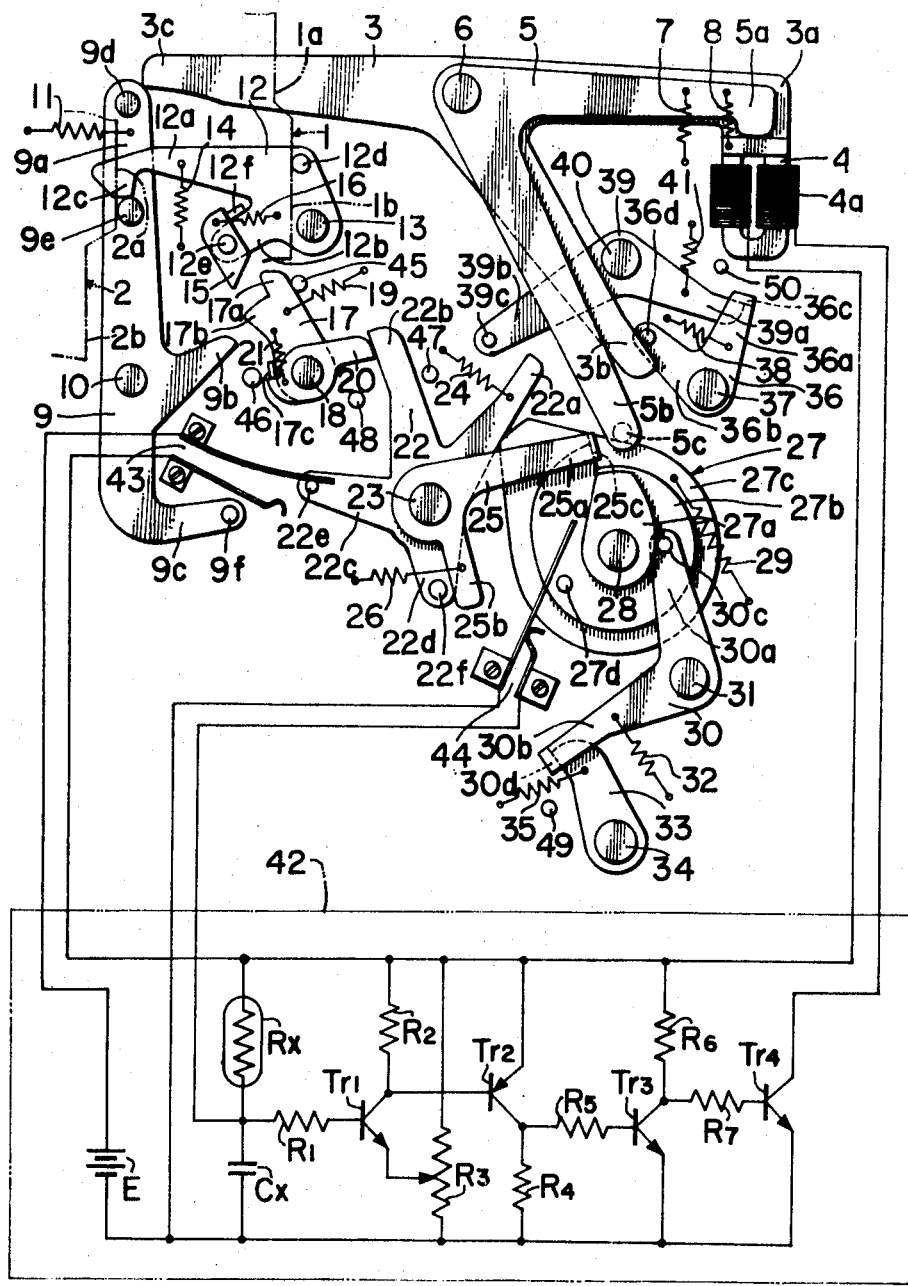
FIG. 1 is a representation showing the cocked position of the mechanism when the device of the present invention is applied to a camera equipped with a focal plane shutter.

The present invention will be described in further detail with respect to a preferred embodiment by referring to the drawings.

In the drawings, a time cam 1 has a bottom portion 1a and a top portion 1b which are formed in the cam face. A bulb cam 2 has a top portion 2a and a bottom portion 2b which are formed in the cam face.

These two cams 1 and 2 are adapted to be moved integrally by a manipulation means, external to the camera body, which is not shown. A magnet lever 3 is provided rotatable about a shaft 6. This magnet lever has three arms 3a, 3b and 3c. The arm 3a is positioned so that it can be brought into contact with the magnetic pole of an electromagnet 4. This electromagnet 4 is energized by connection of a magnet coil 4a to a power source. A holding lever 5 is mounted on shaft 6 for free rotation and has two arms 5a and 5b. The holding lever 5 is given a tendency to rotate clockwise by a spring 7. The arm 5a of holding lever 5 urges, by virtue of this rotating tendency, the arm 3a of the magnet lever 3 against the magnetic pole of the electromagnet 4. A pin 5c extends rearwardly from arm 5b of holding lever 5. A spring 8 is provided between the arm 5a of the holding lever 5 and the arm 3a of the magnet lever 3 so that these two arms are pulled toward each other. A control lever 9 is provided, is freely rotatable about a shaft 10, and is given a tendency to rotate counterclockwise by means of a spring 11. This control lever 9 has of three arms 9a, 9b and 9c. A pin 9d extends outwardly from the free end of arm 9a of the control lever 9. This pin 9d is capable of engaging the arm 3c of the magnet lever 3. A pin 9f extends outwardly from the arm 9c of the control lever 9. A locking lever 12 is provided for free rotation about a shaft 13 and is given a tendency to rotate counterclockwise by a spring 14. This locking lever 12 has two arms 12a and 12b. A hook portion 12c is formed in the free end portion of the arm 12a of said locking lever 12. A pin 12d extends outwardly from an intermediate portion of the arm 12a. This pin 12d is capable of engaging the time cam 1. A pin 12e extends outwardly from the other arm 12b of said chloride lever 12. A click lever 15 is rotatably mounted on said pin 12e. This click lever 15 is given a tendency to rotate clockwise by a spring 16 which is provided between said click lever 15 and chloride locking lever 12. A stopper 12f is formed by a part from said locking lever 12 and it serves to limit the clockwise rotation of the click lever 15.

A first release lever 17 in rotatably mounted about a shaft 18 and is given a tendency to rotate clockwise by a spring 19.

A Y-shaped portion having lugs 17a and 17b is formed at the foremost end of said first release lever 17. One 17a of these two lugs is capable of engaging the click lever 15, and the other 17b of said lugs is capable of engaging the arm 9b of the control lever 9.

A click lever 20 is rotatably mounted on said shaft 18, and it is given a tendency to rotate clockwise by a spring 21 provided between said click lever 20 and the first release lever 17. A stopper 17c is formed with a part of the first release lever 17 to limit the clockwise rotation of said click lever 20.

A second release lever 22 is rotatably mounted on a shaft 23 and it is given a tendency to rotate counterclockwise by virtue of a spring 24. This second release lever 22 is provided with four arms 22a, 22b, 22c and 22d. Pins 22e and 22f extend outwardly from the arms 22c and 22d, respectively. The arm 22b is capable of engaging the click lever 20.

A third release lever 25 is rotatably mounted on said shaft 23 and is given a tendency to rotate clockwise by means of a spring 26. This third release lever 25 is of two arms 25a and 25b. A bent portion 25c is formed at the foremost end of the arm 25a. The arm 25b is capable of engaging the pin 22f of the second release lever 22.

A cam block 27 is formed integrally by a starting cam 27a, a hook cam 27b and a holding lever cam 27c. This cam block 27 is rotatably mounted on a shaft 28 and is given a tendency to rotate clockwise by means of a spring 29. A pin 27d extends outwardly from the hook cam 27b.

A locking lever 30 for a first blade is rotatably mounted on a shaft 31, and it is given a tendency to rotate counterclockwise by a spring 32. This locking lever 30 is provided with two arms 30a and 30b. Arm 30a has a pin 30c extending outwardly therefrom. This pin 30c is in engagement with the starting cam 27a. A bent portion 30d is formed at the foremost end of the other arm 30b of lever 30.

A lever 33 for driving a first blade is rotatably mounted on a shaft 34 and is given a tendency to rotate counterclockwise by means of a spring 35. The foremost end of said lever 33 is capable of engaging the bent portion 30d of the locking lever 30. The aforesaid lever 33 is operative so as to move a first blade (not shown) as a result of the counterclockwise rotation of said lever 33, to thereby open the shutter.

A locking lever 36 for a second blade is rotatably mounted on a shaft 37, and it is given a tendency to rotate counterclockwise by means of a spring 38. This lever 36 is of two arms 36a and 36b. A bent portion 36c is formed at the foremost end of the arm 36a. A pin 36d extends outwardly from the arm 36b. This pin 36d is in engagement with the arm 3b of the magnet lever 3.

A lever 39 for driving a second blade is rotatably mounted on a shaft 40, and it is given a tendency to rotate counterclockwise by means of a spring 41. This lever 39 is provided with two arms 39a and 39b. The foremost end of the arm 39a is capable of engaging the bent portion 36c of locking lever 36. A pin 39c extends outwardly from the arm 39b. This pin 39c is capable of engaging the arm 22a of the second release lever 22. Lever 39 is operative so as to move a second blade (not shown) by virtue of its counterclockwise rotation, to thereby close the shutter.

The electric current which flows through a magnet coil 4a of the electromagnet 4 is automatically controlled by an electronic circuit 42 to thereby control the exposure time. Circuit 42 includes a light-sensitive element Rx, a capacitor Cx, transistors $Tr_1 - Tr_4$, a battery E serving as the power source, resistors $R_1 - R_7$ and the like. A switch 43 is the power switch of said control circuit 42.

Both the pin 9f of the aforesaid control lever 9 and the pin 22e of the second shutter release lever 22 are capable of engaging the two contact members of the power switch 43.

The pin 27d of said cam block 27 is capable of engaging one of the contact members of the trigger switch 44. Stops 45 – 50 are used to limit the movements of their respectively associated levers.

In FIG. 1, the shutter blade driving mechanism is shown in its cocked state when the camera is set to the bulb exposure position.

Figure 2:
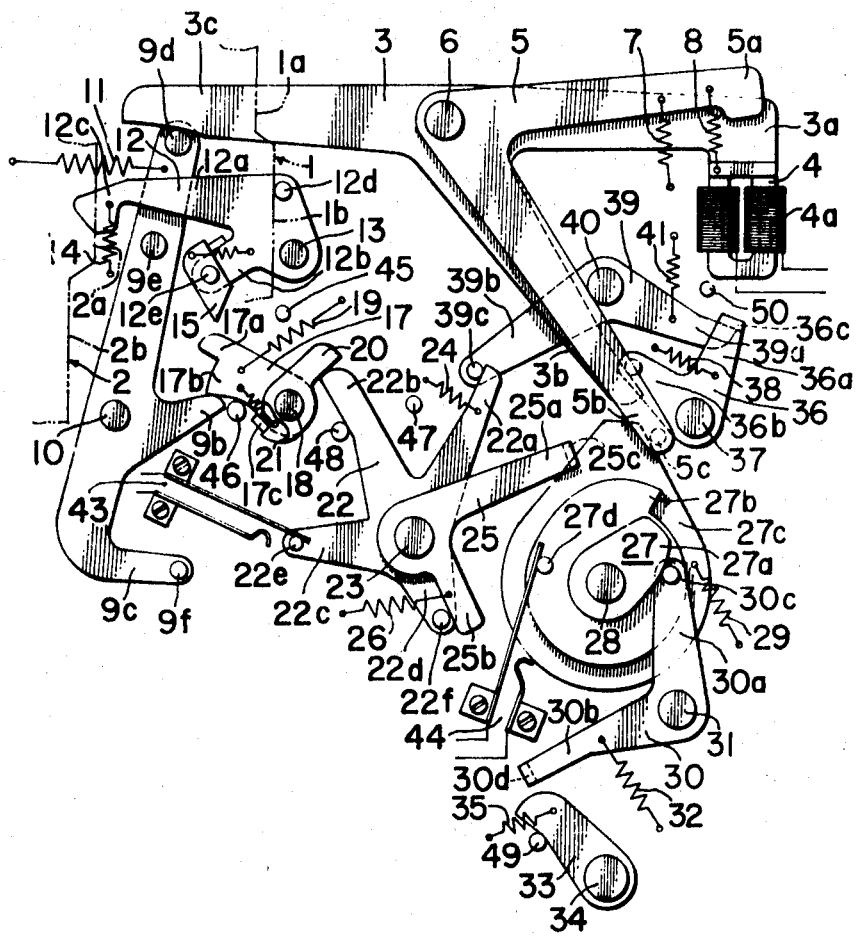
FIG. 2 is a representation showing the state of the device in which a bulb exposure is being performed in the embodiment of FIG. 1, with the exception that the electronic circuit for automatically controlling the exposure time shown in FIG. 1 is not repeated.

In this condition of the camera, a release knob (not shown) may be depressed. As a result, the first release lever 17 is moved counterclockwise as shown in FIG. 2. Accordingly, lug 17b of the Y-shape portion of said first release lever 17 pushes the arm 9b of the control lever 9 so that this lever 9 is rotated clockwise. In this condition, since the pin 12d of the locking lever 12 is positioned to face the top portion 1b of the cam 1, the hook portion 12c of the locking lever 12 is not allowed to engage the pin 9e even when the control lever 9 is rotated clockwise. At the same time, the pin 9d of the control lever 9 is brought into engagement with the arm 3c of the magnet lever 3.

On the other hand, the click lever 20 is disengaged from the arm 22b of the second release lever 22 by virtue of the counterclockwise rotation of the first release lever 17, with the result that this second release lever 22 is caused to rotate counterclockwise. During this operation, the two contact members of the power switch 43 are placed in the position in which they are not in contact.

It is to be noted that the spring 24 is more powerful than the spring 26. Accordingly, the third release lever 25 is pressed at its arm 25b by the pin 22f of the second release lever 22 so that this third release lever 25 is rotated jointly with the second release lever 22. By virtue of this rotation, the bent portion 25c of the third release lever 25 is disengaged from the hook cam 27of the cam block 27, so that this cam block 27 is caused to rotate clockwise.

Because the pin 30c of the locking lever 30 for a first blade is subjected to the influence of the cam block 27, said locking lever 30 is caused to rotate clockwise by virtue of the rotation of the cam block 27. Accordingly, the bent portion 30d of the locking lever 30 for a first blade is relieved from engagement with the foremost end of the lever 33 assigned for driving a first blade. Whereupon, lever 33, which has till then been arrested in its movement, is caused to rotate counterclockwise so that the first blade (not shown) of the shutter, which is interlocked with lever 33, is forced to move, and as a result, the shutter is opened.

Also, holding lever 5 is caused to make a counterclockwise rotation in accordance with the movement of the pin 5c of said holding lever 5 which is in engagement with the holding lever cam 27c of the cam block 27. During this operation, the magnet lever is subjected to a force from the spring 8, to thereby cause this magnet lever 3 to rotate counterclockwise. Since, however, arm 3c of the magnet lever 3 is prevented form moving by virtue of the pin 9d of the control lever 9, the magnet lever 3 is retained in its initial position. As a result, when the pressure applied to the release knob (not shown) is removed therefrom and when, accordingly, the first release lever 17 is rotated clockwise from the position shown in FIG. 2, the control lever 9 is caused to rotate counterclockwise. Whereupon, the engagement between the pin 9d of the control lever 9 and in arm 3c of the magnet lever 3 is relieved. This will cause the magnet lever 3 to be rotated counterclockwise. Accordingly, the locking lever 36 for the second blade is caused to make a clockwise rotation by virtue of the arm 3b of the magnet lever 3 to thereby relieve the locking lever 36 of its locking engagement with the lever 39, causing lever 39 to rotate counterclockwise. As a result, the shutter is closed, and thus the bulb exposure is accomplished.

Description will next be made of the operation when a time exposure is performed.

Let us now assume that the cam block 27 is caused to make a counterclockwise rotation from the stationary position by virtue of a cocking means (not shown) as a result of a cocking manipulation. Then the hook cam 27b of the cam block 27 will thereby be placed into the locked state by the portion 25c of the third release lever 25. At the same time, the lever 33 for driving the first blade is rotated clockwise and is locked by the bent portion 30d of the locking lever 30. Furthermore, simultaneously therewith, the lever 39 for driving the second blade will be caused to make a clockwise rotation by said cocking means, so that lever 39 is locked by the bent portion 36c.

The state of the device in which the shutter driving mechanism is cocked in the manner just described is shown in FIG. 1.

Figure 3:
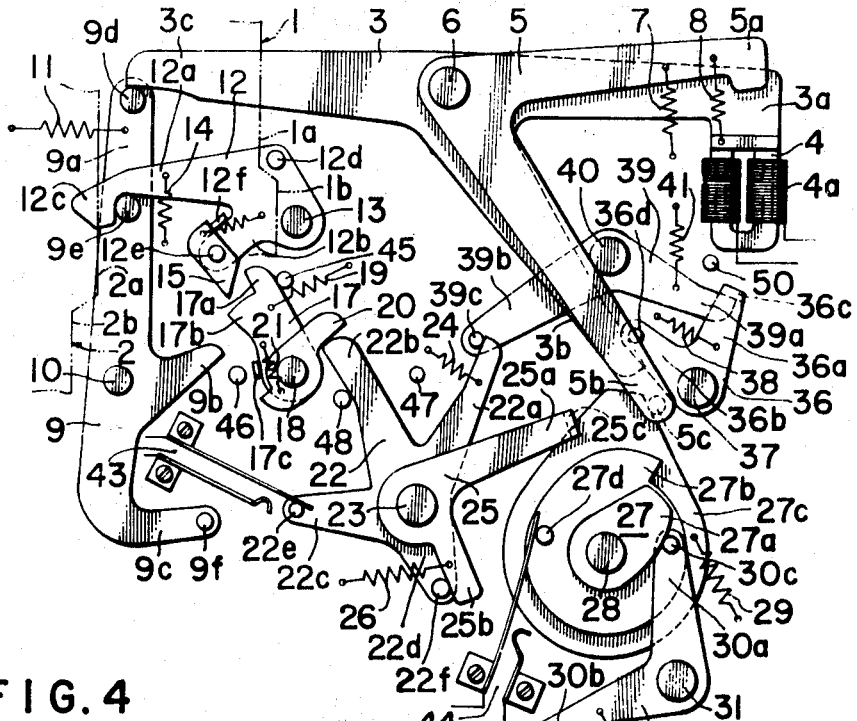
FIG. 3 is a representation showing the state of the device in which a time exposure is being performed in the embodiment of FIG. 1, with the exception that the electronic circuit for automatically controlling the exposure time shown in FIG. 1 is not repeated.

From this state, the cams 1 and 2 are shifted in their positions as shown in FIG. 3, and as a result, the camera is set to the time exposure position. Thereupon, a release knob (not shown) may be depressed, so that the first release lever 17 is caused to make a counterclockwise rotation, and as a result, there will be performed an operation in a manner similar to that described with respect to the bulb exposure operation and the shutter is opened. In this instance, however, the locking lever 12 which has until then been arrested in its movement by pin 9e of the control lever 9, will be rotated counterclockwise. This is because the pin 12d of said locking lever 12 is positioned to face the bottom portion 1a of the time cam 1, so that the locking lever 12 cannot be hindered of its movement. Control lever 9 will be kept in its state of being rotated clockwise, since the pin 9e of said control lever 9 is held by the hook portion 12c of the locking lever 12.

When, in the foregoing state of the mechanism, the pressure, which has until then been applied to the release knob, is removed, the first release lever 17 will operate in such a way that lug 17a of the Y-shape portion pushes aside the click lever 15. As a result, first release lever 17 will return to its initial position. However, other levers and cam block continue to be retained in their released positions, and accordingly, the shutter is retained in its open state. During this operation, the power switch 43 of said control circuit 42 remains in its open state, and therefore, the battery E will not be consumed. The state of the device in this state is illustrated in FIG. 3.

When pressure is again applied to the release knob (not shown) in the state of the respective levers and cam block shown in FIG. 3, the first release lever 17 will be rotated counterclockwise. Owing to this counterclockwise rotation of the first release lever 17, lug 17a of the Y-shape portion of said lever 17 will push the click lever 15 which belongs to the locking lever 12. Accordingly, this lever 12 is caused to make a clockwise rotation.

As a result, the pin 9e of the control lever 9 will be relieved from its condition of being held by the hook portion 12c of the locking lever 12, and accordingly, control lever 9 will be rotated counterclockwise. As a result, the engagement between the pin 9d of the control lever 9 and the arm 3c of the magnet lever 3 will be removed. The magnet lever 3, which has been subjected to the force urging it to rotate counterclockwise by means of the holding lever 5, will at that time be caused to make a counterclockwise rotation since the electromagnet 4 is not actuated.

Owing to this counterclockwise rotation of the magnet lever 3, the arm 3b of this lever 3 will push the pin 36d of the locking lever 36, and therefore, this lever 36 will be rotated clockwise. This clockwise rotation of the lever 36 will cause the bent portion 36c of this lever 36 to be relieved from its engagement with the arm 39a of the lever 39 assigned for driving a second blade. As a result, lever 39 is rotated counterclockwise. Owing to this movement of the lever 39, the second blade of the shutter (not shown), which is interlocked with lever 39, is shifted in its position, to thereby close the shutter, and thus the time exposure is accomplished. During this operation, pin 39c of lever 39 will push arm 22a of the second shutter release lever 22, so that this lever 22 is returned to its initial position.

Then, upon the removal of the pressure applied to the release knob (not shown), the first release lever 17 is rotated clockwise to return to its initial position, and along with this, the click lever 20 is brought into a position engageable with the arm 22b of the second release lever 22.

Description will next be made of the ordinary photographic operation in which the exposure time is controlled by the electronic circuit.

Figure 4:
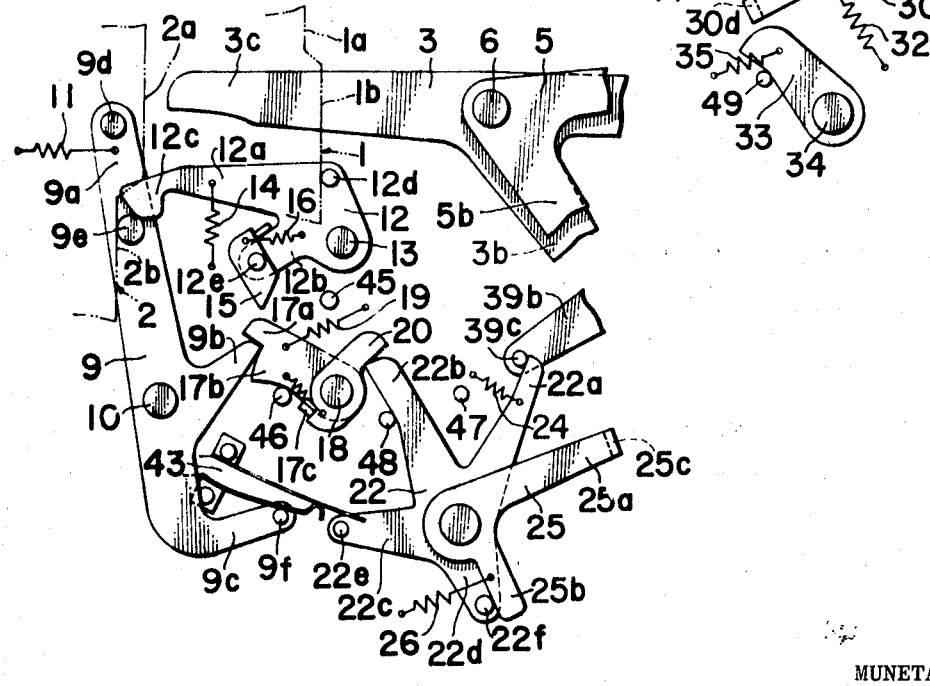
FIG. 4 is a representation showing the state of the device in which ordinary (so-called instant) photography is being performed in the embodiment of FIG. 1, with the exception that the electronic circuit for automatically controlling the exposure time and some parts of the mechanism shown in FIG. 1 are not repeated.

In this instance, the cams 1 and 2 are shifted from their positions shown in FIG. 1, as will be noted from FIG. 4, and as a result, the camera is set to the automatic exposure position. Then, the release knob (not shown) may be depressed to cause the first release lever 17 to be rotated counterclockwise as shown in FIG. 4. Whereupon, the rest of the mechanism which is associated with first release lever 17 will be actuated to operate in a manner similar to those described in connection with the aforesaid bulb exposure. In this instance, however, the pin 12d of the locking lever 12 remains in engagement with the top portion 1b of the time cam 1, so that this locking lever 12 is making a hampered from making a counterclockwise rotation. The pin 9e of the control lever 9, on the other hand, is placed in the position in which it faces the bottom portion 2b of the bulb cam 2. Therefore, this control lever 9 continues to be rotated counterclockwise until the pin 9e of control lever 9 is brought into engagement with the bottom portion 2b of the bulb cam 2. At this time, one of the contact members of the power switch 43 has been urged toward the other contact member of said switch 43 by the movement of the pin 9f of the control lever 9. Therefore, because of the counterclockwise rotation of the second release lever 22, the power switch 43 is closed and, accordingly, control circuit 42 is actuated. This state of the mechanism can best be observed in FIG. 4. In this condition of the device, the magnet 4 is actuated. Accordingly, the magnet lever 3 can hold its initial position even when the pin 9d of the control lever 9 is not in engagement with the arm 3c of the magnet lever 3.

Then, as the cam block 27 is rotated as a result of the releasing manipulation, the lever 33 for driving the first blade is rotated counterclockwise, causing the shutter to be opened. Along with this, the trigger switch 44 of control circuit 42 is opened by the pin 27d of the cam block 27. Whereupon, in control circuit 42, the delay time, which is determined by both the resistance value of the light-sensitive element Rx and the capacitance of capacitor Cx begins to be measured when trigger switch 44 is opened. The delay time has thus been determined actually in accordance with the intensity of the incident light coming from the object to be photographed. The control circuit 42 will operate in such a way that, at the end of the delay time, it interrupts the supply of power to the coil 4a of the electromagnet 4. Whereupon, the electromagnet 4 is deprived of its magnet force, and the magnet lever 3 is caused to be rotated counterclockwise. This rotation of the magnet lever 3, in turn, will cause the rotation of the lever 39 assigned for driving the second blade, and thus, the shutter is closed. In this way, an automatic exposure is accomplished.

As stated above, by the use of the device of the present invention, the power switch 43 will always be open both during the bulb exposure and during the time exposure operations.

In the foregoing embodiment, the two contact members of the power switch 43 are arranged so that they can be brought respectively into contact with the pin 9f of the control lever 9 and also the pin 22e of the second release lever 22. It should be noted also that the device of the present invention may be applied equally effectively to the instance in which these two contact members are arranged to be brought respectively into contact with the bulb cam 2 (or the time cam 1) and also said pin 22e of the second release lever 22. Furthermore, another power switch can be provided in series with the power switch 43 so that the former is operative to open during the bulb exposure operation or during the time exposure operation. In the latter case, it is necessary for the power switch 43 to be arranged to be closed in any mode of operation when the second release lever 22 is rotated counterclockwise.

In the foregoing description, the invention has been disclosed as applied to a camera equipped with a focal plane shutter. It should be understood also that the device of the present invention can be applied equally effectively to a camera equipped with a lens shutter.

As many substitutions or modifications could be made in the above described construction, and as many apparently widely different embodiments of the invention within the scope of the appended claims could be constructed without departing from the scope and the spirit of the present invention, it is intended that all matters contained in this specification shall be interpreted as being illustrative and not in a limiting sense.

I claim:
1. In a bulb exposure control device for a photographic camera comprising:
   a. an electronic control circuit for controlling exposure time during instant operation, including an electric power source and a power switch adapted to connect said power source to supply power to operate the control circuit;
   b. a shutter arranged to be sequentially cocked, opened, and closed;
   c. release means arranged when operated to open said shutter and to close said power switch;
   d. an electro magnet having a pole and connected to be energized when the power switch is closed and to be subsequently deenergized by the control circuit; and
   e. a pole-contacting member arranged to be brought into contact with the pole when said shutter is cocked and to be forced away from the pole when the electromagnet is deenergized for closing said shutter, the improvement comprising:
   f. a bulb cam arranged to be selectively set to a first position corresponding to instant operation of the camera and to a second position corresponding to bulb operation of the camera;
   g. a control means connected to be shifted by the bulb cam when the bulb cam is in the second position into a position in which the control means is interlocked with the release means, and further connected to be moved by the release means, prior to the opening of the shutter, into a position to prevent the pole-contacting member from being forced away from the pole, and
   h. prevention means operative when the bulb cam is in the second position for preventing the power source from supplying power to operate the control circuit.

2. A device according to claim 1 in which the prevention means comprises means for preventing the power switch from being closed by said release means.

3. A device according to claim 1 in which the prevention means comprises means for opening an additional switch in series with said power switch.

4. In a bulb exposure control device for a photographic camera having an electronically controlled shutter, containing an electronic control circuit for controlling exposure time and an electromagnet controlled by said control circuit, the improvement comprising:
   a. a magnet lever arranged to be subjected, during the open state of the shutter, to a spring force urging the magnet lever to move away from the electromagnet against the attraction force of said electromagnet,
   b. a bulb cam arranged to be set selectively to either a bulb exposure position or an instant exposure position and having a face including a top portion and a bottom portion formed in the face,
   c. a first release lever arranged to be moved interlockingly with a manual release mechanism,
   d. a control lever arranged to engage the top portion of said bulb cam and to be moved in response to said first release lever for arresting movement of said magnet lever away from the electromagnet when the bulb cam is set to the bulb exposure position, and also arranged to be brought into engagement with the bottom portion of the bulb cam and not to be engaged with said first release lever when the latter is set to the instant exposure position,
   e. a second release lever moved by said first release lever for starting a shutter driving means, and
   f. a power switch comprising two contact members, one of which is arranged so as to be engageable with said control lever, the other of said contact members being arranged so as to be engageable with said second release lever, so that these two contact members are brought into contact with each other only when said second release lever is moved by the first release lever while the bulb cam is set to the instant exposure position.

5. A device according to claim 4 wherein said one contact member is engageable responsive to said bulb cam.

6. In a time and bulb exposure control device for use in a camera having an electronically controlled shutter, comprising: an electronic control circuit for controlling exposure time and an electromagnet controlled by said control circuit, the improvement comprising:
   a magnet lever arranged to be subjected, when the shutter is open, to a spring force urging the magnet lever to move away from the electromagnet against the attraction force of said electromagnet,
   a time cam and a bulb cam formed integrally with each other, each cam having a face with a top portion and a bottom portion formed therein, and adapted to be selectively set to any one of three positions respectively corresponding to time exposures, bulb exposures, and instant exposures,
   a first release lever arranged to be moved interlockingly with a manual release mechanism,
   a control lever arranged to engage the top portion of said bulb cam and to be moved by said first release lever for arresting the movement of the magnet lever away from said electromagnet when said bulb cam is selectively set to either the time exposure position or the bulb exposure position, and also adapted to be brought into contact with the bottom portion of said bulb cam and not to be engaged with said first release lever when said bulb cam is set to the instant exposure position,
   a locking lever having a click lever capable of being rotated in a single direction but being limited in rotation in other directions, arranged to be brought into engagement with the bottom portion of said time cam when said time cam is set to the time exposure position, so that said control lever is locked by said locking lever in a position in which the movement of said magnet lever is arrested by said control lever, and adapted to be brought into engagement with the top portion of said time cam when the time cam is selectively set to either the bulb exposure position or the instant exposure position, whereby said locking lever is placed outside the range which will affect the control lever,
   a second release lever moved by said first release lever for starting a shutter driving means, and
   a power switch comprising two contact members, one of which is arranged so as to be engageable with said control lever and the other being arranged so as to be engageable with said second release lever, whereby these two members are brought into contact with each other only when said second release lever is moved by the first release lever when both the time cam and the bulb cam are set to the instant exposure position.

7. A device according to claim 6 wherein said one contact member is engageable responsive to said bulb cam.

8. A device according to claim 6 wherein said one contact member is engageable responsive to said time cam.

* * * * *